United States Patent Office 3,296,089
Patented Jan. 3, 1967

3,296,089
PROCESS FOR THE PRODUCTION OF RIBOSYL-
PHOSPHATES OF 8-AZAPURINE DERIVATIVES
BY FERMENTATION
Kiyoshi Nakayama, Sagamihara-shi, Zenroku Sato, Machida-shi, and Haruo Tanaka, Tokyo, Japan, assignors to Kyowa Hakko Kogyo Co., Ltd., Chiyoda-ku, Tokyo, Japan, a corporation of Japan
No Drawing. Filed Nov. 25, 1964, Ser. No. 414,018
Claims priority, application Japan, Nov. 27, 1963, 38/63,232
16 Claims. (Cl. 195—28)

This invention relates to the production of ribonucleotides. More particularly it relates to the production of 5'-ribosyl phosphates (including monophosphate, diphosphate and triphosphate), of compounds which are derivatives of 8-azapurine. The instant invention provides a process whereby the 5'-ribosyl phosphates of derivatives of 8-azapurine are produced economically and upon an industrial scale.

The 5'-ribosyl phosphates of derivatives of 8-azapurine produced by the process of this invention are compounds of the formula:

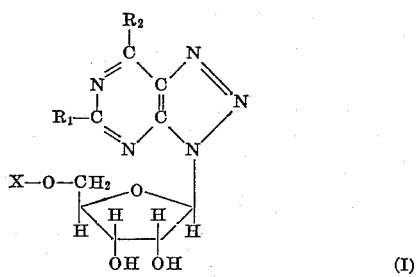

(I)

wherein $R_1$ and $R_2$ represent the same or different group and are H, OH, $NH_2$, or SH, and
X represents one of the groups

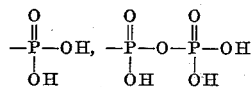

and

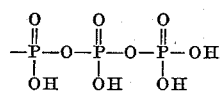

Derivatives of 8-azapurine have recently come under extensive investigation for use in the treatment of leukemia. The ribosyl phosphates of these derivates of 8-azapurine have also recently come into importance in investigations relating to the same utility.

Various investigations have been made into the processes for the production of nucleotides wherein microorganisms are employed. As a result of these investigations it has been found that when a microorganism which is a bacterium belonging to Brevibacterium ammoniagenes is cultured in a fermentation medium containing (1) a derivative of 8-azapurine of the formula

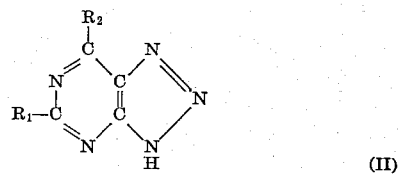

(II)

wherein $R_1$ and $R_2$ are as in Formula I, or (2) a riboside thereof the formula

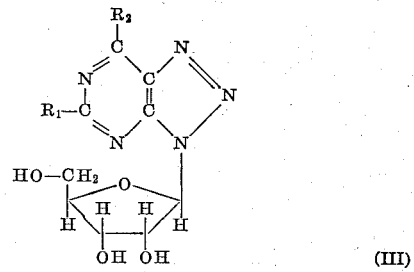

(III)

wherein $R_1$ and $R_2$ are as defined in Formula I, remarkable quantities of the 5'-ribosyl phosphates of Formula I are formed and accumulate in the fermentation medium.

This is a phenomenon which has been previously unknown and this invention is based upon this discovery.

The special features of this invention are that (1) an 8-azapurine derivative or a riboside thereof is present in the fermentation medium and (2) a microorganism which is a bacterium belonging to Brevibacterium ammoniagenes is employed.

As the medium used in the invention, any of the media which contain a carbon source such as carbohydrates and the like (for example, glucose, hydrolysis product of starch and molasses), a nitrogen source (for example, urea, ammonium chloride and ammonium nitrate), inorganic substances (for example, potassium phosphates, magnesium sulfate and calcium chloride) and nitrogen-containing natural products (for example, corn steep liquor, yeast extract, meat extract, peptone and fish meal), in the proper ratio, may be employed. These media are well known in the art. When a specific nutrient-requiring strain of Brevibacterium ammoniagenes is employed the substance which satisfies the growth requirements of the strain must, of course, be present in the medium.

When used in the instant specification and claims, the term "8-azapurine derivative" is intended to encompass compounds of Formula II as well as various functional derivatives thereof such as salts which will yield the free 8-azapurine compound in the fermentation medium under the conditions of the fermentation.

According to the invention, the 8-azapurine derivative or the riboside thereof present in the medium can be present at the commencement of the fermentation or they may be added to the fermentation medium during the course of the fermentation. When it is added during the course of the fermentation, it may be added at one time or several portions may be added during the course of the fermentation. In addition the 8-azapurine derivative can be that which is formed in the medium during the fermentation due to the properties of the strain of Brevibacterium ammoniagenes being used. Additionally, as indicated by the definition of the term "8-azapurine derivative" the 8-azapurine present in the medium may be that which is formed in situ from a functional derivative of the 8-azapurine, as for example, a salt, e.g., a sulfate, which derivative is added to the medium at the beginning of the fermentation or during the course of the fermentation.

The amount of the 8-azapurine derivative employed in the present invention and which is added to the medium will vary over a wide range. It will be somewhat dependent upon the specific strain of bacterium used. In general it will be in the range of from about 0.1 gram to about 10 grams per liter of medium. It is preferred that the amount be in the range of from 1 to 5 grams per liter of fermentation medium. In the event a compound which yield 8-azapurine derivative under the conditions of the fermentation is employed then the amount of the compound will be selected so that the proper amount of 8-azapurine derivative is present in the medium during the fermentation.

The fermentation is performed under aerobic conditions, for example in a shaking culture or a submerged culture with aeration and stirring. It is conducted at a temperature of between 20° C. and 40° C. and at a pH between 5.5 and 9.0. The period of cultivation in usually 2 to 8 days, and in the process remarkable quantities of 5'-ribosyl phosphates of 8-azapurine derivatives are formed and accumulate in the medium and the cells.

The ribosyl phosphates of 8-azapurine derivatives can be recovered from the medium after completion of the cultivation by means which are per se known in the art as for example, ion-exchange resin treatment, adsorption process, precipitation process or extraction process.

The following examples are presented to illustrate the invention. They are not to be construed as in any way limiting the same. Percentages are by weight.

*Example 1*

An inoculant culture is prepared by cultivating *Brevibacterium ammoniagenes* (ATCC 6872) in a medium containing 2% of glucose, 1% of peptone, 1% of yeast extract, 0.3% of NaCl and 30 micrograms per liter ($\mu$g./l.) of biotin, at 30° C. for 24 hours. The fermentation medium is inoculated with 10% by volume of this inoculant culture. Both media are used after placing 20-milliliter (ml.) portions of them in 250 ml. Erlenmeyer flasks and sterlizing them. The fermentation medium used has the following composition and fermentation is performed at 30° C. in a shaking culture.

Composition of the fermentation medium:

| | |
|---|---|
| Glucose, grams | 100 |
| Urea, g. | 6 |
| $K_2HPO_4$, g. | 10 |
| $KH_2PO_4$, g. | 10 |
| $MgSO_4 \cdot 7H_2O$, g. | 10 |
| $CaCl_2 \cdot 2H_2O$, g. | 0.1 |
| Biotin, $\mu$g. | 30 |
| Calcium pantothenate, mg. | 2 |
| Thiamine, mg. | 5 |
| Peptone, g. | 5 |

The above quantities are dissolved in water and filled up to one liter. The above-mentioned portions of the solution are put in flasks after adjusting the pH at 8.0 with NaOH and sterilized in an autoclave under the conditional 24 hours. Thus 3.73 mg./ml. of 8-azaguanosine-for 10 minutes.

After 48 hours' cultivation, such a quantity of 2-amino-6-hydroxy-8-azapurine (8-azaguanine) is added so that its concentration becomes 2 milligrams per milliliter (mg./ml.) and the cultivation is continued for an additional 24 hours. Thus 3.73 mg./ml. of 8-azaguanosine-5'-triphosphate and 0.51 mg./ml. of 8-azaguanosine-5'-diphosphate are formed and accumulate in the ferementation medium.

The phosphates of 8-azaguanosine are recovered by means of ion-exchange resin treatment in the following manner: The filtrate (1.2 liter) obtained by removing the cells from fermentation broth is treated with active carbon and the phosphates of 8-azaguanosine absorbed on the carbon are eluted with 50% aqueous ethanol containing 3% ammonia. The ammonia in the eluate is removed by evaporation under vacuum. The solution thus obtained is passed through the resin tower of a polystylene strongly basic anion exchange resin Dowex 1x2 (Cl-type), the resin tower which absorbed the phosphates of 8-azaguanosine is washed with water, eluted gradiently with 0.01 N HCl, 0.05 N HCl, 0.1 N HCl and 0.5 N HCl, in this order. The eluate fractions each containing 8-azoguanosine-5'-triphosphate and 8-azaguanosine-5'-diphosphate are condensed and cooled after the addition of ethanol. The 8-azaguanosine-5'-triphosphate and 8-azaguanosine-5'-diphosphate precipitated are recovered by centrifuge and dried (yield; 8-azaguanosine-5'-triphosphate 1.4 g., 8-azaguanosine-5'-diphosphate 0.2 g.).

*Example 2*

Cultivation is carried out in the same manner as in Example 1, except that 8-azaguanine is added after 72 hours' cultivation. When cultivation is continued for an additional 24 hours after the addition of 8-azaguanine, 2.68 mg./ml. of 8-azaguanosine-5'-triphosphate, 0.75 mg./ml. of 8-azaguanosine-5'-diphosphate and 0.79 mg./ml. of 8-azaguanosine-5'-monophosphate are formed and accumulate in the fermentation medium.

*Example 3*

A fermentation medium which is prepared by substituting 10 g. of yeast extract for calcium pantothenate, thiamine and peptone in the composition of the fermentation medium used in Example 1, is used. Cultivation is carried out under the same conditions as employed in Example 1 in other respects and such a quantity of 6-amino-8-azapurine (8-aza-adenine) is added into the fermentation medium that its concentration becomes 2 mg./ml., after 72 hours' cultivation. When cultivation is carried out for further 24 hours., 1.62 mg./ml. of 5'-ribosyl triphosphate of 8-aza-adenine is formed and accumulates in the fermentation medium together with very small quantities of the corresponding diphosphate and monophosphate.

*Example 4*

Cultivation is carried out in the same manner as in Example 1, except that *Brevibacterium ammoniagenes* ATCC 6871 is used, 1.30 mg./ml. of 8-azaguanosine-5'-triphosphate and small quantities of 8-azaquanosine-5'-diphosphate are formed and accumulate in the fermentation medium.

*Example 5*

Cultivation is carried out in the same manner as in Example 1, except that *Brevibacterium ammoniagenes* KY 3464 (ATCC No. 15750) is used, 4.23 mg./ml. of 8-azaguanosine-5'-triphosphate and 0.90 mg./ml. of 8-azaguanosine-5'-diphosphate are formed and accumulate in the fermentation medium.

*Example 6*

Cultivation is carried out in the same manner as in Example 1, except that *Brevibacterium ammoniagenes* KY 3465 (ATCC No. 15751) is used 3.90 mg./ml. of 8-azaguanosine-5'-triphosphate and 1.20 mg./ml. of 8-azaguanosine-5'-diphosphate are formed and accumulate in the fermentation medium.

In the same manner as in the preceeding examples additional strains of *Brevibacterium ammoniagenes* may be cultured in a fermentation medium containing other 8-azapurine derivatives or the ribosides thereof to obtain 5'-ribosyl phosphates of the 8-azapurine derivative in substantially similar yields.

What is claimed is:

1. A process for the production of 5′-ribosyl phosphates of the formula

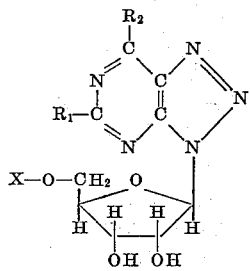

wherein $R_1$ is a member selected from the group consisting of H and $NH_2$ and $R_2$ is a member selected from the group consisting of OH and $NH_2$, $R_1$ being H when $R_2$ is $NH_2$ and being $NH_2$ when $R_2$ is OH, and X represents a member selected from the group consisting of

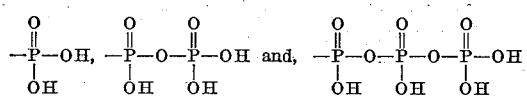

which comprises culturing a bacterium belonging to *Brevibacterium ammoniagenes* in a fermentation medium therefor which, in addition to the normal constituents thereof, contains a member selected from the group consisting of an 8-azapurine derivative of the formula

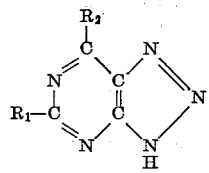

wherein $R_1$ and $R_2$ have the significance previously assigned, and a riboside thereof of the formula

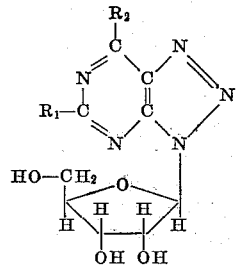

wherein $R_1$ and $R_2$ have the significance previously assigned, whereby objective 5′-ribosyl phosphate accumulates in the said medium, and recovering the said accumulated 5′-ribosyl phosphate.

2. A process for the production of 5′-ribosyl phosphates of the formula

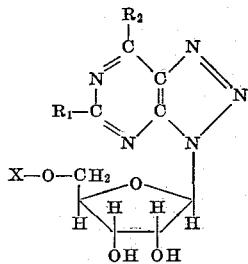

wherein $R_1$ is a member selected from the group consisting of H and $NH_2$ and $R_2$ is a member selected from the group consisting of OH and $NH_2$, $R_1$ being H when $R_2$ is $NH_2$ and being $NH_2$ when $R_2$ is OH, and X represents a member selected from the group consisting of

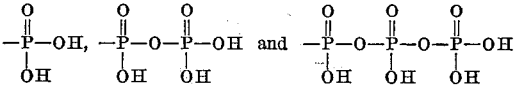

which comprises culturing a bacterium belonging to *Brevibacterium ammoniagenes* in a fermentation medium therefor which, in addition to the normal constituents thereof, contains an 8-azapurine derivative of the formula

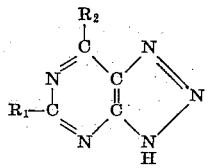

wherein $R_1$ and $R_2$ have the significance previously assigned, whereby objective 5′-ribosyl phosphate accumulates in the said medium, and recovering the said accumulated 5′-ribosyl phosphate.

3. A process as in claim 2 wherein 8-azapurine derivative is added to the fermentation medium during the culturing of the bacterium.

4. A process for the production of 5′-ribosyl phosphates of the formula

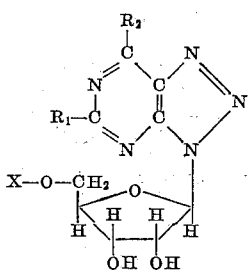

wherein $R_1$ is a member selected from the group consisting of H and $NH_2$ and $R_2$ is a member selected from the group consisting of OH and $NH_2$, $R_1$ being H when $R_2$ is $NH_2$ and being $NH_2$ when $R_2$ is OH, and X represents a member selected from the group consisting of

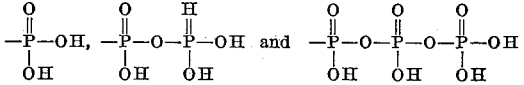

which comprises culturing a bacterium belonging to *Brevibacterium ammoniagenes* in a fermentation medium therefor which, in addition to the normal constituents thereof, contains an 8-azapurine derivative of the formula

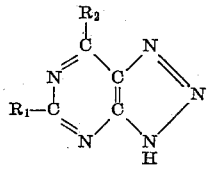

wherein $R_1$ and $R_2$ have the significance previously assigned, said culturing being carried out at a temperature of from 20° to 40° C. and at a pH of from 5.5 to 9, whereby objective 5′-ribosyl phosphate accumulates in the said medium, and recovering the said accumulated 5′-ribosyl phosphate.

5. A process as in claim 4 wherein the 8-azapurine derivative is 2-amino-6-hydroxy-8-azapurine.

6. A process for the production of 5'-ribosyl phosphates of the formula

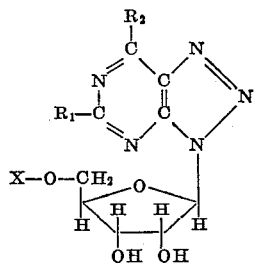

wherein $R_1$ is a member selected from the group consisting of H and $NH_2$ and $R_2$ is a member selected from the group consisting of OH and $NH_2$, $R_1$ being H when $R_2$ is $NH_2$ and being $NH_2$ when $R_2$ is OH, and X represents a member selected from the group consisting of

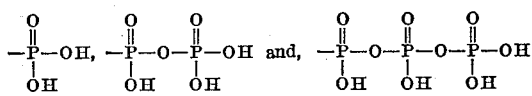

which comprises culturing a bacterium belonging to *Brevibacterium ammoniagenes* in a fermentation medium therefor which, in addition to the normal constituents thereof, contains a riboside of the formula

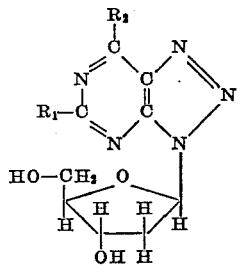

wherein $R_1$ and $R_2$ have the significance previously assigned, whereby objective 5'-ribosyl phosphate accumulates in the said medium, and recovering the said accumulated 5'-ribosyl phosphate.

7. A process for the production of 5'-ribosyl phosphates of the formula

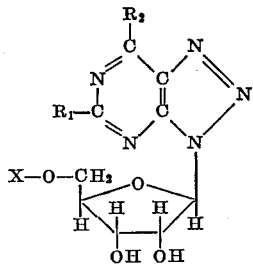

wherein $R_1$ is a member selected from the group consisting of H and $NH_2$ and $R_2$ is a member selected from the group consisting of OH and $NH_2$, $R_1$ being H when $R_2$ is $NH_2$ and being $NH_2$ when $R_2$ is OH, and X represents a member selected from the group consisting of

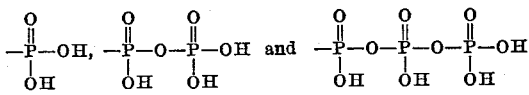

which comprises culturing *Brevibacterium ammoniagenes* (ATCC No. 6872) in a culture medium therefor which, in addition to the normal constituents thereof, contains an 8-azapurine derivative of the formula

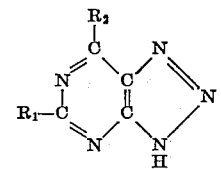

wherein $R_1$ and $R_2$ have the significance previously assigned, whereby objective 5'-ribosyl phosphate accumulates in the said medium, and recovering the said accumulated 5'-ribosyl phosphate.

8. A process for the production of 5'-ribosyl phosphates of 2-amino-6-hydroxy-8-azapurine which comprises culturing *Brevibacterium ammoniagenes* (ATCC No. 6872) in a culture medium therefor which, in addition to the normal constituents thereof, contains 2-amino-6-hydroxy-8-azapurine, whereby objective 5'-ribosyl phosphate acmulates in the said medium, and recovering the said accumulated 5'-ribosyl phosphate.

9. A process for the production of 5'-ribosyl phosphates of 6-amino-8-azapurine which comprises culturing *Brevibacterium ammoniagenes* (ATCC No. 6872) in a culture medium therefor which, in addition to the normal constituents thereof, contains 6-amino-8-azapurine.

10. A process as in claim 8 wherein the 2-amino-6-hydroxy-8-azapurine is added to the fermentation medium during the culturing of the microorganism.

11. In the process for the fermentative production of 5'-ribosyl phosphates of the formula

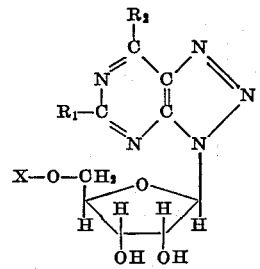

wherein $R_1$ is a member selected from the group consisting of H and $NH_2$ and $R_2$ is a member selected from the group consisting of OH and $NH_2$, $R_1$ being H when $R_2$ is $NH_2$ and being $NH_2$ when $R_2$ is OH, and X represents a member selected from the group consisting of

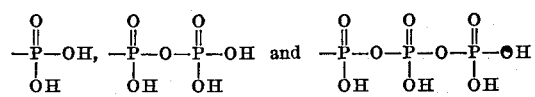

by culturing a microorganism in a fermentation medium, the improvement wherein the microorganism is a bacterium belonging to *Brevibacterium ammoniagenes* and the fermentation medium contains a member selected from the group consisting of an 8-azapurine derivative of the formula

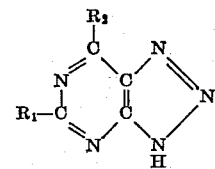

wherein $R_1$ and $R_2$ have the significance previously assigned, and a riboside thereof of the formula

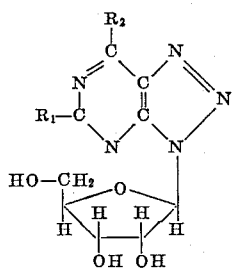

wherein $R_1$ and $R_2$ have the significance previously assigned, whereby the objective 5'-ribosyl phosphate accumulates in said medium, and wherein the accumulated 5'-ribosyl phosphate is recovered from said medium.

12. A process as in claim 11 wherein the microorganism is *Brevibacterium ammoniagenes* (ATCC No. 6872) and the 8-azapurine derivative is 2-amino-6-hydroxy-8-azapurine.

13. A process as in claim 11 wherein the microorganism is *Brevibacterium ammoniagenes* (ATCC No. 6872) and the 8-azapurine derivative is 6-amino-8-azapurine.

14. A process as in claim 11 wherein the microorganism is *Brevibacterium ammoniagenes* (ATCC No. 6871) and the 8-azapurine derivative is 2-amino-6-hydroxy-8-azapurine.

15. A process as in claim 11 wherein the microorganism is *Brevibacterium ammoniagenes* KY 3464 (ATCC No. 15750) and the 8-azapurine derivative is 2-amino-6-hydroxy-8-azapurine.

16. A process as in claim 11 wherein the microorganism is *Brevibacterium ammoniagenes* KY 3465 (ATCC No. 15751) and the 8-azapurine derivative is 2-amino-6-hydroxy-8-azapurine.

References Cited by the Examiner
FOREIGN PATENTS
368,806   6/1963   Switzerland.

A. LOUIS MONACELL, *Primary Examiner.*
ALVIN E. TANENHOLTZ, *Examiner.*